(12) United States Patent
Freeman et al.

(10) Patent No.: US 11,084,537 B2
(45) Date of Patent: Aug. 10, 2021

(54) STRUCTURAL ACCESS PANEL

(71) Applicant: Honda Motor Co., Ltd., Tokyo (JP)

(72) Inventors: Christopher R. Freeman, Dublin, OH (US); Patrick J. Ellison, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 16/362,731

(22) Filed: Mar. 25, 2019

(65) Prior Publication Data

US 2020/0307717 A1 Oct. 1, 2020

(51) Int. Cl.
*B62D 25/24* (2006.01)
*B62D 29/00* (2006.01)
*B62D 29/02* (2006.01)
*B62D 29/04* (2006.01)

(52) U.S. Cl.
CPC .......... *B62D 25/24* (2013.01); *B62D 29/001* (2013.01); *B62D 29/02* (2013.01); *B62D 29/041* (2013.01)

(58) Field of Classification Search
CPC ...................................... B62D 25/24
USPC ...................................... 296/193.07
See application file for complete search history.

(56) References Cited

U.S. PATENT DOCUMENTS

| | | | |
|---|---|---|---|
| 4,081,197 A * | 3/1978 | Ackel | B62D 21/09 |
| | | | 180/382 |
| 4,588,104 A * | 5/1986 | Danico | B62D 25/24 |
| | | | 220/326 |
| 7,114,219 B2 * | 10/2006 | Kiefer | E05D 5/062 |
| | | | 16/366 |
| 7,625,037 B2 | 12/2009 | Gollehur et al. | |
| 10,603,998 B2 * | 3/2020 | Toyota | B60K 1/04 |
| 2008/0238035 A1 * | 10/2008 | Stutts | B60D 1/36 |
| | | | 280/477 |
| 2016/0176445 A1 * | 6/2016 | Ito | B62D 25/24 |
| | | | 296/193.07 |
| 2017/0036617 A1 * | 2/2017 | Greggs | B60P 1/44 |
| 2018/0355948 A1 * | 12/2018 | Malone | B62D 27/065 |

FOREIGN PATENT DOCUMENTS

| | | |
|---|---|---|
| CN | 202686541 U | 1/2013 |
| CN | 103350723 B | 4/2015 |
| CN | 103899754 B | 3/2016 |
| CN | 205819346 U | 12/2016 |
| CN | 207889842 U | 9/2018 |

* cited by examiner

*Primary Examiner* — Joseph D. Pape
(74) *Attorney, Agent, or Firm* — American Honda Motor Co., Inc.; Morgan Lincoln

(57) ABSTRACT

An access panel for a body of a vehicle is provided that includes a dome portion, a flat portion, and an extension portion. The dome portion has a reinforcing element. The extension portion extends from the flat portion. A floor panel structure for a vehicle is also provided that includes a metal sheet and an access panel. The metal sheet includes an aperture. The access panel includes a dome portion, a flat portion, and an extension portion. The access panel is coupled to the metal sheet over the aperture, and the flat portion and the extension portion are configured to transmit a downward force applied to the access panel to the metal sheet.

20 Claims, 4 Drawing Sheets

STRUCTURAL ACCESS PANEL

BACKGROUND

Automobiles often have vehicle components placed in locations that are not readily accessible. This limited accessibility may result in greater work needed to access said vehicle components for servicing. One example of a vehicle component that may not be readily accessible is a fuel pump. Often a vehicle's fuel pump is located inside of a fuel tank of the vehicle and accessible from a top portion of the fuel tank. However, the fuel tank is often positioned under a floor panel of the vehicle, limiting access to the top portion of the fuel tank and thus limiting access to the fuel pump for maintenance and/or service.

To provide access to the fuel pump, often an aperture is provided in the floor panel adjacent the fuel pump. The aperture allows the fuel pump to be accessed from an interior cabin space of the vehicle. In such instances, an access panel, or cover, is often included over the aperture to provide a physical barrier between an exterior and the interior cabin space of the vehicle. However, the floor panel often functions as a structural component of the vehicle; for example, to support a vehicle seat. Given potential structural requirements of the floor panel at the portion including the aperture, it may be beneficial to provide an access panel attached thereto that includes structural features that are configured to work with the floor panel to maintain desired structural characteristics.

BRIEF SUMMARY

According to one aspect, an access panel for a body of a vehicle includes a dome portion, a flat portion, and an extension portion. The dome portion has a reinforcing element. The extension portion extends from the flat portion.

According to another aspect, a floor panel structure for a vehicle includes a metal sheet and an access panel. The metal sheet includes an aperture. The access panel includes a dome portion, a flat portion, and an extension portion. The access panel is coupled to the metal sheet over the aperture, and the flat portion and the extension portion are configured to transmit a downward force applied to the access panel to the metal sheet.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

With reference now to the figures wherein the illustrations are for purposes of illustrating one or more exemplary embodiments and not for purposes of limiting the same, there is shown an access panel.

Figure 1:
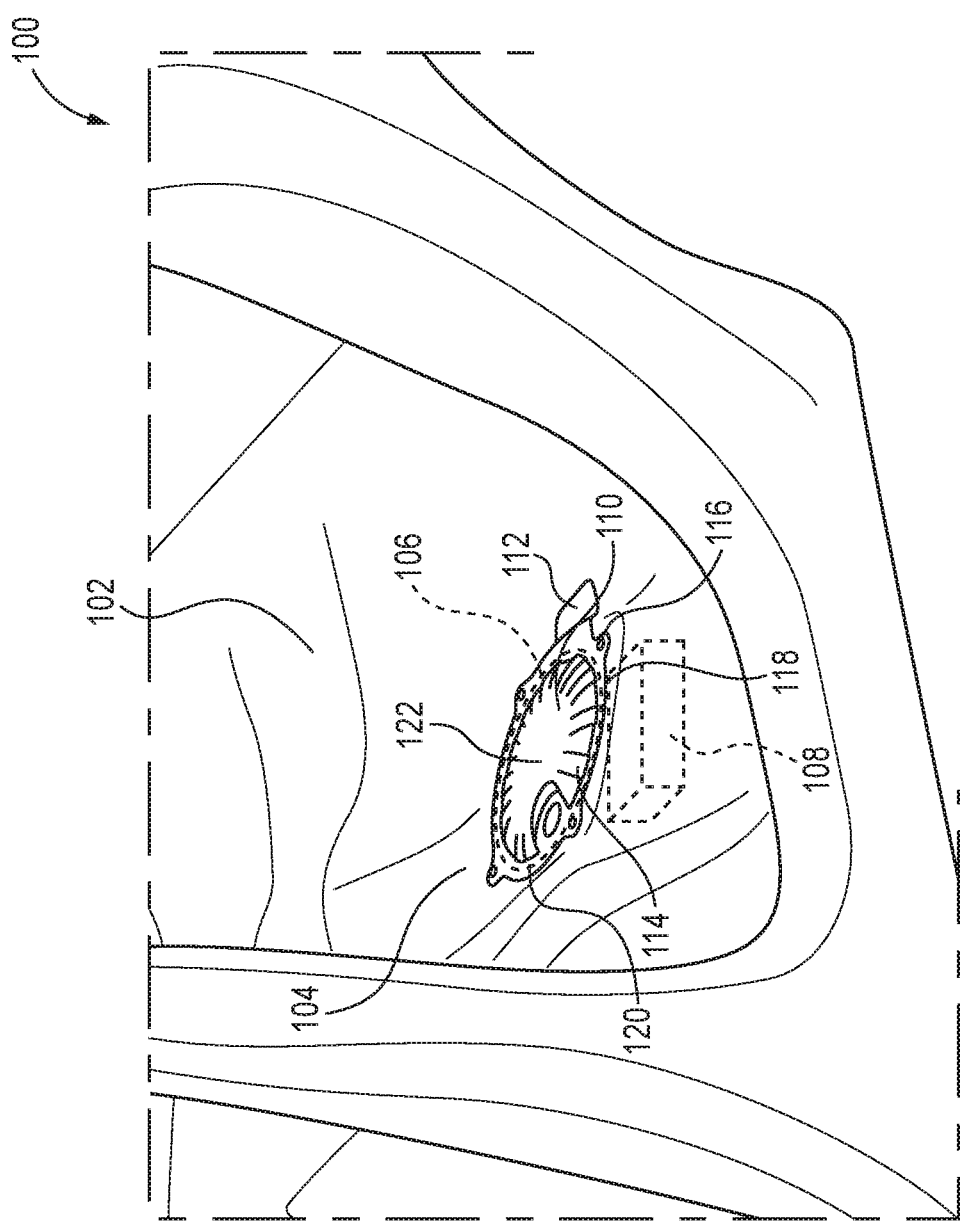
FIG. 1 is a perspective view of an exemplary embodiment of a rear floor panel structure of a vehicle with an access panel.

FIG. 1 is a perspective view of an exemplary embodiment of a rear floor panel structure 102 of a vehicle 100 with an access panel 110. The floor panel structure 102 includes a horizontally disposed panel that may define a bottom surface of the vehicle 100. The floor panel structure 102 is a stamped metal sheet in the disclosed embodiment, and includes a seat portion 104 onto which a vehicle seat is coupled. The vehicle seat may be used to carry passengers and/or cargo within the vehicle 100.

The floor panel structure 102 also includes an aperture 106 defined therein that provides access through the floor panel structure 102. For example, the aperture 106 may provide access from an interior cabin space of the vehicle 100 to an exterior space. In one embodiment, the aperture 106 may be positioned to allow access to a vehicle component, such as a fuel pump 108 for example, disposed on an opposing side of the floor panel structure 102. In other words, a person (i.e., service mechanic) positioned within the vehicle can access a vehicle component positioned outside of the vehicle through the aperture 106. The aperture 106 may be disposed under the vehicle seat in a typical vehicle configuration wherein occupants are present within the vehicle 100. As shown in FIG. 1, the vehicle seat may be removed to provide access to the aperture 106 and fuel pump 108 disposed thereunder.

To substantially close the aperture 106 and isolate the interior of the vehicle 100 from an exterior environment wherein the vehicle component is located, a cover may be placed over the aperture 106. In the disclosed embodiment, an access panel 110 covers the aperture 106. The access panel 110 is coupled to the floor panel structure 102 in the disclosed embodiment using a mounting clip 116. In other embodiments, the access panel 110 may be coupled to the floor panel structure 102 using other known fastening methods such as screws, bolts, rivets, or adhesive, for example. The access panel 110 is removably coupled to the floor panel structure 102 to allow removal for access to the vehicle component disposed thereunder. The access panel 110 may further include an extension portion, referred to hereinafter as extension 112, and a rib projection 114, as will be described further with respect to following Figures.

The floor panel structure 102 in the disclosed embodiment has a substantially angled surface at the portion whereon the access panel 110 is positioned. The angle of said surface is configured in a downward direction from a front end of the vehicle 100 to a rear end of the vehicle 100. The access panel 110 in the disclosed embodiment is oriented such that the extension 112 is positioned toward the rear end of the vehicle 100. In other words, the extension 112 is positioned at the downward-most end of the access panel 110 as it is coupled to the floor panel structure 102.

Disposed between the access panel 110 and the floor panel structure 102 may also be a seal 118. The seal 118 may be configured to seal a flat portion 120 of the access panel 110 with the floor panel structure 102, wherein the flat portion 120 substantially extends around a perimeter of the access panel 110. The seal may further comprise a rubber material or a cork material, for example.

As discussed herein, vertical (i.e., upward, downward) and horizontal (i.e., left, right) directions may be used in describing features of the access panel 110. For the purposes of this description, these directions are in reference to the coupled position of the access panel 110 to the floor panel structure 102. In other words, the flat portion 120 of the access panel 110 is seated on the floor panel structure 102, and a dome portion 122 is facing away from the floor panel structure 102 in a substantially upward direction.

Figure 2:
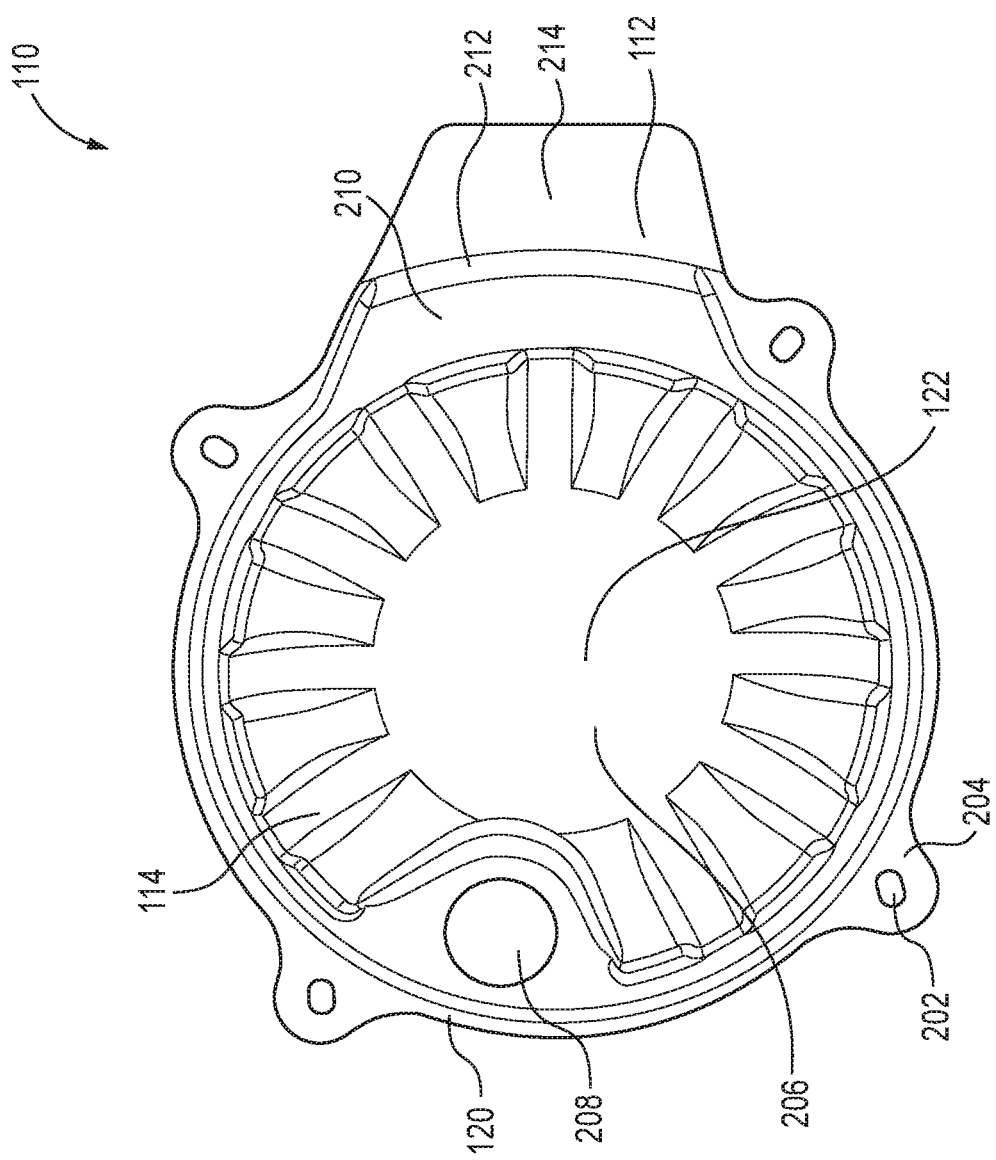
FIG. 2 is a plan view of the access panel shown in FIG. 1

FIG. 2 is a plan view of the access panel 110; showing a top of the access panel 110 in a downward direction. The dome portion 122 of the access panel 110 is substantially round shaped as shown in the plan view. The flat portion 120 surrounds a perimeter of the dome portion 122. The access panel 110 may be created from a metal sheet using a forming method such as stamping, for example. As described, the access panel 110 may comprise a steel material or an aluminum material. In an alternative embodiment, the access panel 110 may comprise a plastic material and be created using a known molding method, such as plastic injection molding, for example.

The access panel 110 is coupled to the floor panel structure 102 at mounting hole 202 defined in the flat portion 120. There are four mounting hole 202 shown in the disclosed embodiment, however other embodiments may have more or less of the mounting hole 202 (i.e., two or six). The mounting hole 202 may also be substantially oblong shaped, as in the disclosed embodiment, to allow for minor adjustments along the horizontal plane. In other embodiments, the mounting hole may be round shaped. The mounting hole 202 is defined within a wing or flange 204 of the flat portion 120 extending radially outwardly relative to a center portion 206 of the access panel 110. The number of flange 204 may be the same as the number of mounting hole 202 defined within the access panel 110; for example, the disclosed embodiment has four of the flange 204, coinciding with each of the four mounting hole 202. In other embodiments, the access panel 110 may not include a flange 204 and the mounting hole 202 may be defined within the flat portion 120.

The access panel 110 may further include a clip aperture 208 defined within the dome portion 122. The clip aperture 208 is configured to receive a harness clip of a wiring harness that extends through the clip aperture 208. The wiring harness may include control and/or signal wires for a fuel pump, for example, or for other vehicle components disposed outside of the interior cabin space of the vehicle 100.

The access panel 110 also includes a structural feature to provide increased strength in a downward direction (e.g., towards the floor panel structure 102). The structural feature is the rib projection 114 in the disclosed embodiment, wherein the rib projection 114 extends outwardly from the center portion 206 of the access panel 110. The rib projection 114 may be formed integrally with the access panel 110 and project upward (e.g., away from the floor panel structure 102), or project downward (e.g., toward the floor panel structure 102). In other words, the rib projection 114 is disposed within the dome portion 122 of the access panel 110 to provide the dome portion 122 with increased strength in the vertical direction.

The access panel 110 further includes the extension 112 extending in a horizontal direction from a perimeter of the flat portion 120, away from the center portion 206. The extension 112 is generally rectangular shaped as shown in the plan view and includes an upper portion 210, an inclined portion 212, and a lower portion 214.

Figure 3:
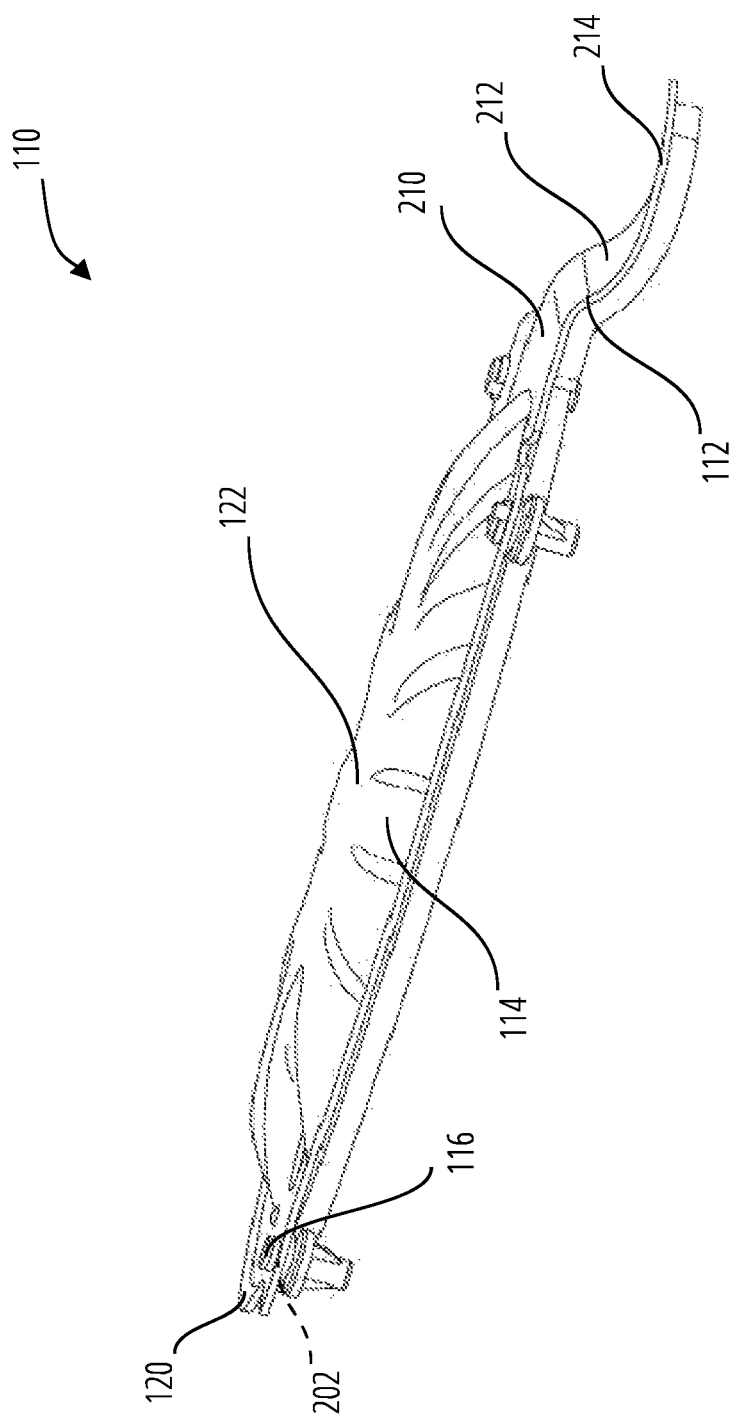
FIG. 3 is a side view of the access panel shown in FIG. 1.

FIG. 3 is a side view of the access panel 110. The extension 112 extends downward in the vertical direction. More specifically, the upper portion 210 extends outward from the center portion 206 of the access panel 110, the inclined portion 212 is adjacent the upper portion 210 and angles downward towards the floor panel structure 102, and the lower portion 214 is adjacent the inclined portion 212 at an opposing side of the inclined portion 212 from the upper portion 210 and extends outward from the center portion 206. An angle between the inclined portion 212 and lower portion 214 is 90 degrees or greater. The upper portion 210 and the lower portion 214 are each parallel to respective portions of the floor panel structure 102 to which they are adjacent.

The extension 112 may be configured to provide structural support between the access panel 110 and the floor panel structure 102. More specifically, the lower portion 214 may be configured to contact the floor panel structure 102 and provide structural support, in additional to the flat portion 120 contacting the floor panel structure 102. In other words, if a downward force is applied to the access panel 110 towards the floor panel structure 102, both the flat portion 120 and the lower portion 214 may transfer the downward force to the floor panel structure 102. The downward force may be, for example, due to a passenger seated in a vehicle seat positioned over the access panel 110.

As previously described, the extension 112 may be positioned at the rear and downward-most position of the access panel 110, relative to the vehicle 100, in order to help distribute the load created by the downward force described above onto the floor panel structure 102; more specifically, the downward force applied to the access panel 110 is transferred to the floor panel structure 102 through the extension 112 and mounting clip 116 at the flat portion 120. With the access panel 110 coupled to an angled surface of the floor panel structure 102, the downward force exerted in a substantially downward direction will create a force on the access panel 110 in a downward and rearward direction (e.g., in the direction of the downward angle of the surface). By orienting the extension 112 at the downward-most portion of the access panel 110, some load that is exerted in the rearward direction may travel through the extension 112 to the floor panel structure 102. This may, in turn, relieve some shear stress exerted on the mounting clip 116.

Figure 4:
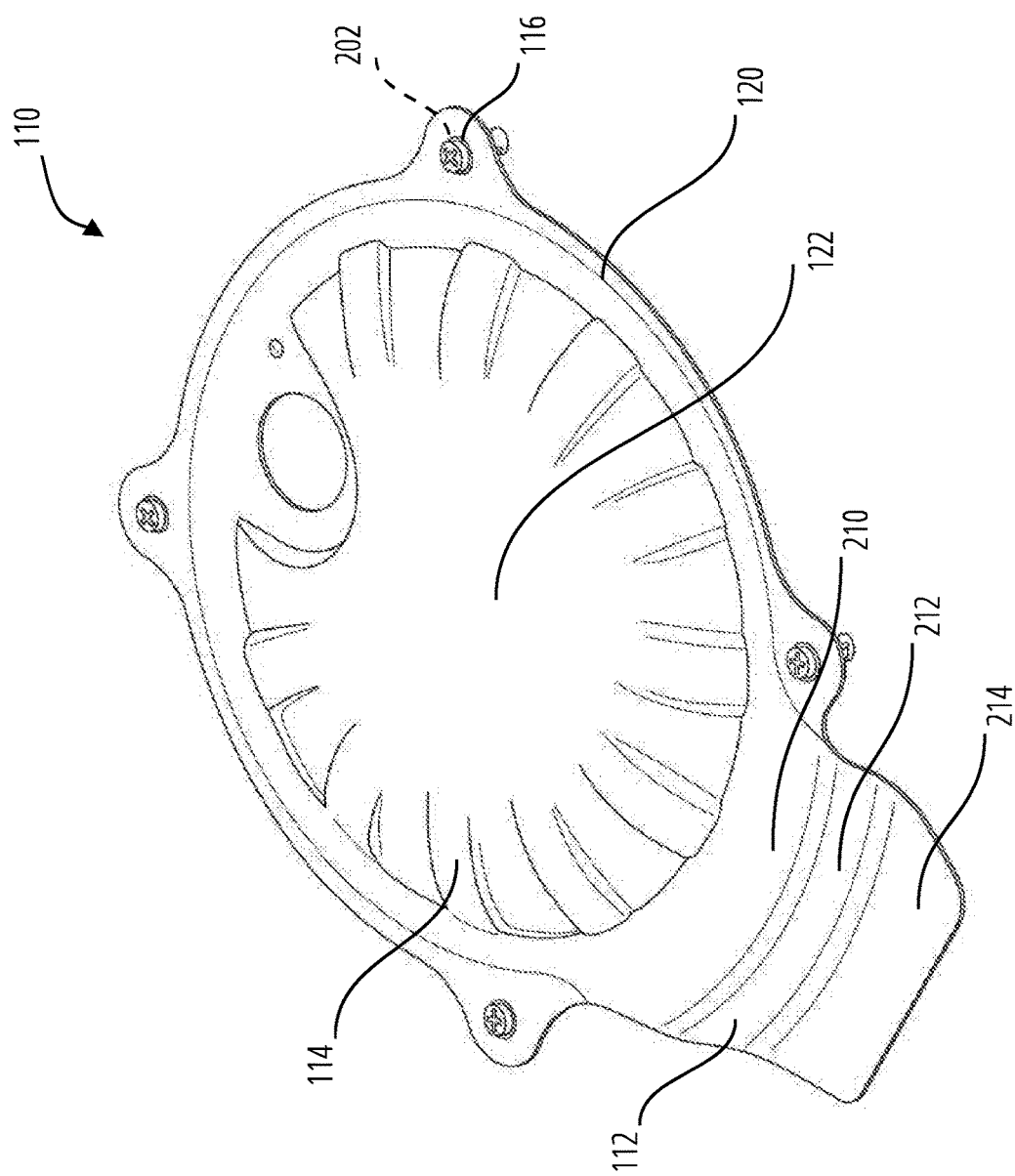
FIG. 4 is a perspective view of the access panel shown in FIG. 1.

FIG. 4 is a perspective view of the access panel 110. As shown in the disclosed embodiment, the mounting clip 116 may include a screw head for removal from the floor panel structure 102.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. An access panel for a body of a vehicle, comprising:
a dome portion that has a round shave and a reinforcing element;
a flat portion that extends around a perimeter of the dome portion and contacts the vehicle body; and
an extension portion extending from the flat portion and that contacts the vehicle body.

2. The access panel of claim 1, wherein the reinforcing element is a rib projection.

3. The access panel of claim 2, wherein the rib projection extends in a radially outward direction from a center portion of the dome portion.

4. The access panel of claim 1, wherein the dome portion is substantially dome shaped.

5. The access panel of claim 1, wherein the extension portion comprises an upper portion, an inclined portion, and a lower portion.

6. The access panel of claim 5, wherein the inclined portion and the lower portion form an angle that is greater than or equal to 90 degrees.

7. The access panel of claim 1, further comprising a mounting hole defined in the flat portion.

8. The access panel of claim 7, wherein the mounting hole is substantially oblong shaped.

9. The access panel of claim 1, further comprising a clip aperture defined in the dome portion that is configured to receive a harness clip.

10. The access panel of claim 1, further comprising a steel material.

11. The access panel of claim 1, further comprising an aluminum material.

12. A floor panel structure for a vehicle, comprising:
a metal sheet that includes an aperture; and
an access panel that includes a dome portion having a round shape, a flat portion that contacts the metal sheet and an extension portion that contacts the metal sheet; and
wherein the access panel is coupled to the metal sheet over the aperture, and the flat portion and the extension portion are configured to transmit a downward force applied to the access panel to the metal sheet.

13. The floor panel structure of claim 12, further comprising a seal disposed between the access panel and the metal sheet.

14. The floor panel structure of claim 13, wherein the seal comprises one of a rubber material and a cork material.

15. The floor panel structure of claim 12, wherein the extension portion comprises an upper portion, an inclined portion, and a lower portion.

16. The floor panel structure of claim 15, wherein the inclined portion and the lower portion form an angle that is greater than or equal to 90 degrees.

17. The floor panel structure of claim 12, wherein the aperture is configured to provide access to a vehicle component disposed under the metal sheet.

18. The floor panel structure of claim 12, wherein the dome portion includes a reinforcing element.

19. The floor panel structure of claim 18, wherein the reinforcing element is a rib projection that extends in a radially outward direction from a center portion of the dome portion.

20. The floor panel structure of claim 12, wherein the access panel is removably coupled to the metal sheet.

* * * * *